United States Patent
Liu et al.

(10) Patent No.: US 11,952,882 B2
(45) Date of Patent: Apr. 9, 2024

(54) METHOD FOR THE DETERMINATION OF MUD WEIGHT WINDOW IN N-POROSITY N-PERMEABILITY FORMATIONS

(71) Applicant: ARAMCO SERVICES COMPANY, Houston, TX (US)

(72) Inventors: Chao Liu, Brookshire, TX (US); Yanhui Han, Houston, TX (US); Dung T. Phan, Brookshire, TX (US); Younane N. Abousleiman, Norman, OK (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 226 days.

(21) Appl. No.: 17/648,034

(22) Filed: Jan. 14, 2022

(65) Prior Publication Data
US 2023/0228181 A1    Jul. 20, 2023

(51) Int. Cl.
*E21B 44/00*    (2006.01)
*E21B 7/04*    (2006.01)
(Continued)

(52) U.S. Cl.
CPC ............... *E21B 44/00* (2013.01); *E21B 7/04* (2013.01); *E21B 21/08* (2013.01); *E21B 49/00* (2013.01);
(Continued)

(58) Field of Classification Search
None
See application file for complete search history.

(56) References Cited

U.S. PATENT DOCUMENTS 10,837,279 B2    11/2020    Han et al.
2003/0212495 A1    11/2003    Mese et al.
(Continued)

FOREIGN PATENT DOCUMENTS

WO    2020080973 A1    4/2020

OTHER PUBLICATIONS

Abousleiman, Y.N., et al., "The granular and polymer composite nature of kerogen-rich shale", Acta Geotechnica, Springer-Vertrag Berlin Heidelberg, vol. 11, Feb. 2016, pp. 573-594 (22 pages).
(Continued)

*Primary Examiner* — Lina Cordero
(74) *Attorney, Agent, or Firm* — Osha Bergman Watanabe & Burton LLP

(57) ABSTRACT

A method includes obtaining total stresses and pore pressures of each porous medium of a formation, determining a first and second set of effective stresses for the formation, determining an individual collapse and fracturing mud weight for each porous medium of the formation using a first set of associated failure criteria, wherein the first set of associated failure criteria are based on the first set of effective stresses, determining an overall collapse and fracturing mud weight for the formation using a second set of associated failure criteria, wherein the second set of associated failure criteria is based on the second set of effective stresses, determining a mud weight window for the formation using the individual collapse mud weight, the individual fracturing mud weight, the overall collapse mud weight, and the overall fracturing mud weight, and transmitting a command to a drilling system based on the mud weight window.

20 Claims, 10 Drawing Sheets

(51) Int. Cl.
*E21B 21/08* (2006.01)
*E21B 49/00* (2006.01)
*G01V 1/30* (2006.01)

(52) U.S. Cl.
CPC ........ *G01V 1/306* (2013.01); *G01V 2210/624* (2013.01)

(56) References Cited

U.S. PATENT DOCUMENTS

| | | | |
|---|---|---|---|
| 2015/0292323 | A1 | 10/2015 | Shahri et al. |
| 2019/0264559 | A1* | 8/2019 | Han ........................ G06F 30/20 |
| 2019/0368346 | A1 | 12/2019 | Liu et al. |
| 2020/0141231 | A1* | 5/2020 | Han ...................... E21B 49/003 |
| 2021/0277762 | A1* | 9/2021 | Liu ......................... E21B 44/00 |
| 2021/0332690 | A1 | 10/2021 | Stishenko et al. |

OTHER PUBLICATIONS

Barenblatt, G.I., et al., "Basic Concepts in the Theory of Seepage of Homogeneous Liquids in Fissured Rocks [Strata]", vol. 24, No. 5, 1960, pp. 1286-1303 (18 pages).

Biot, Maurice A., "General Theory of Three-Dimensional Consolidation", Journal of Applied Physics, The Ernest Kempton Adams Fund for Physical Research of Columbia University Reprint Series, vol. 12, No. 2, Feb. 1941, pp. 155-164 (11 pages).

Liu, Chao and Younane N. Abousleiman, "Multiporosity/Multipermeability Inclined-Wellbore Solutions With Mudcake Effects", Oct. 2018 SPE Journal, Society of Petroleum Engineers, 2018, pp. 1723-1747 (25 pages).

Liu, C. and Y.N. Abousleiman, "N-Porosity and N-Permeability Generalized Wellbore Stability Analytical Solutions and Applications", ARMA 16-417, American Rock Mechanics Association, Jun. 2016 (9 pages).

Liu, Chao and Younane N. Abousleiman, "Shale Dual-Porosity Dual-Permeability Poromechanical and Chemical Properties Extracted from Experimental Pressure Transmission Tests", Journal of Engineering Mechanics, ASCE, vol. 143, No. 9, 2017 (17 pages).

Liu, Chao, et al., "Wellbore-Stability Analysis by Integrating a Modified Hoek-Brown Failure Criterion With Dual-Porochemoelectroelastic Theory", 2019 SPE Journal, Society of Petroleum Engineers, Mar. 2019, pp. 1-25 (25 pages).

Mehrabian, Amin and Younane N. Abousleiman, "Generalized Biot's theory and Mandel's problem of multiple-porosity and multiple-permeability poroelasticity", Journal of Geophysical Research: Solid Earth, AGU Publications, vol. 119, Apr. 2014, pp. 2745-2763 (19 pages).

Wilson, R.K. and Elias C. Aifantis, "On the Theory of Consolidation with Double Porosity", International Journal of Engineering Science, vol. 20, No. 9, 1982, pp. 1009-1035 (27 pages).

\* cited by examiner

US 11,952,882 B2

METHOD FOR THE DETERMINATION OF MUD WEIGHT WINDOW IN N-POROSITY N-PERMEABILITY FORMATIONS

BACKGROUND

Hydrocarbon fluids may be found in porous formations located far below the Earth's surface. In order to extract the hydrocarbon fluids, wells are drilled into the Earth's surface to gain access to the porous formations. While drilling a well, drilling fluids, also known as "drilling mud," are used to manage downhole pressure, support the wellbore, lubricate, and cool the drill bit, and suspend cuttings. One of the important fluid properties of drilling mud is the fluid density, also known as "mud weight". Mud weight is an integral and vital component in managing downhole pressures. The weight of the drilling mud must be kept within a range in order to ensure the mud weight is large enough to hold back formation fluids and prevent the wellbore from collapsing in on itself yet small enough to prevent fracturing the formation. This range is known in the art as the "mud weight window."

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

The present invention presents systems and methods for determining mud weight windows in accordance with one or more embodiments. The method includes obtaining, by a computer processor, total stresses and pore pressures of each porous medium of a formation using an N-porosity and N-permeability poroelastic wellbore solution, determining, by the computer processor, a first set of effective stresses for each porous medium and a second set of effective stresses for the formation, determining, by the computer processor, an individual collapse mud weight and an individual fracturing mud weight for each porous medium of the formation using a first set of associated failure criteria, wherein the first set of associated failure criteria are based on the first set of effective stresses, determining, by the computer processor, an overall collapse mud weight and an overall fracturing mud weight for the formation using a second set of associated failure criteria, wherein the second set of associated failure criteria is based on the second set of effective stresses, determining, by the computer processor, a mud weight window for the formation using the individual collapse mud weight, the individual fracturing mud weight, the overall collapse mud weight, and the overall fracturing mud weight, and transmitting, by the computer processor, a command to a drilling system based on the mud weight window.

In other embodiments, the system includes a mud processing system coupled to a mud processing device, a drilling system coupled to the mud processing system, and a drilling manager comprising a computer processor. The drilling manager is coupled to the drilling system and the mud processing system. The drilling manager includes functionality for obtaining total stresses and pore pressures of each porous medium of a formation using an N-porosity and N-permeability poroelastic wellbore solution, determining a first set of effective stresses for each porous medium and a second set of effective stresses for the formation, determining an individual collapse mud weight and an individual fracturing mud weight for each porous medium of the formation using a first set of associated failure criteria, wherein the first set of associated failure criteria are based on the first set of effective stresses, determining an overall collapse mud weight and an overall fracturing mud weight for the formation using a second set of associated failure criteria, wherein the second set of associated failure criteria is based on the second set of effective stresses, determining a mud weight window for the formation using the individual collapse mud weight, the individual fracturing mud weight, the overall collapse mud weight, and the overall fracturing mud weight, and transmitting a command to the drilling system based on the mud weight window.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements and have been solely selected for ease of recognition in the drawing.

DETAILED DESCRIPTION

Figure 1:
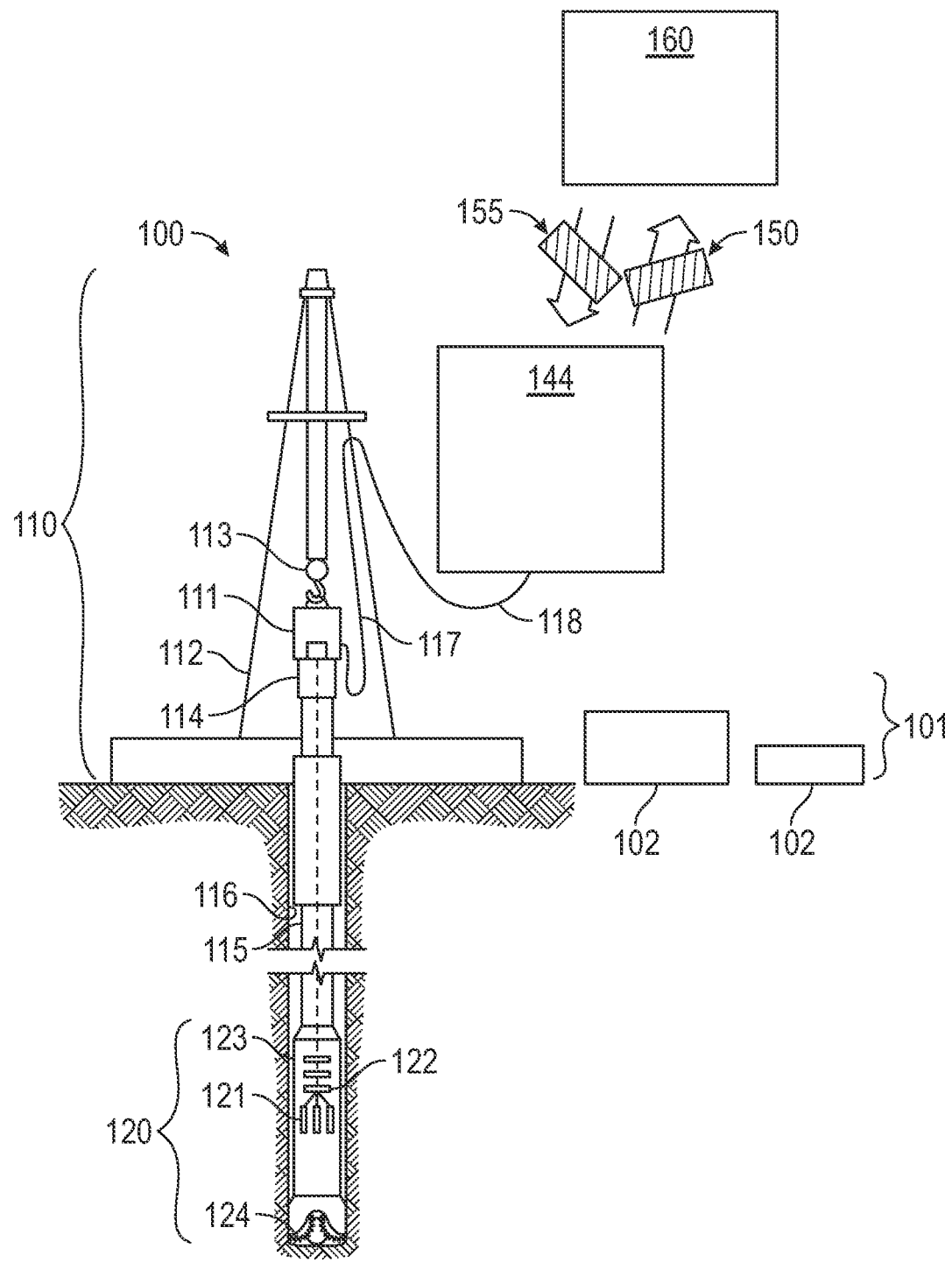
FIG. 1 shows a system in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

A mud weight window for a drilling mud is calculated using a fracture gradient and a pore pressure gradient of a formation. The fracture gradient is the pressure that, when applied, will fracture the formation. The pore pressure gradient is the pressure within the pores of the formation. The pore pressure gradient defines the low end of the mud weight window and the fracture gradient defines the high end of the mud weight window. Typically, as you move deeper into the surface of the Earth, both the fracture gradient and the pore pressure gradient increase. The fracture gradient is determined by analyzing field leak off tests and is known to depend on overburden stress of the formation, pore pressure of the formation, and the depth of the formation. The pore pressure of a formation is determined by hydrostatic pressures and effective stresses.

The current methods of determining the mud weight window of a formation depend on assuming the formation has singular or dual-porosity and singular or dual-permeability. This means that the formation is assumed to have only up to two connected porosities and two connected permeabilities. However, many rock formations, such as shale, have been observed to have more than two porosities and two permeabilities. These formations are said to possess "N-porosity and N-permeability" components. Current methods of determining the mud weight window ignore the imperfect nature of a formation including the presence of natural fractures, porous organic matter, and clay constituents.

Natural fractures tend to have higher compressibility and permeability than the surrounding rock matrix within the formation. Atomic-force-microscopy techniques have shown stiffness differences between porous organic matter and non-organic porous rock matrix. Both the organic matter and the non-organic rock matrix contain hydrocarbons that can flow into the natural micro and macro-fractures having higher permeability. Clay constituents have higher compressibility and lower permeability than non-clay constituents. Because of these multi-porous components, a multi-permeable system is often also present. Furthermore, various minerals in the non-organic matrix and various scales of natural fractures lead to rock formations having more than two connected porosities. When drilling through these N-porosity N-permeability formations using a mud weight calculated based off of a dual-porosity and dual-permeability formation, the mud weight may be too high or too low for the formation.

If the mud weight is too low for the formation, the fluids located in the pores of the formation will uncontrollably enter the well causing detrimental health and safety hazards or the formation will collapse in on the drill string causing the drill string to become stuck. Furthermore, if the mud weight is too high for the formation, the mud may fracture the formation. When the mud fractures the formation, the mud may become lost to the formation causing a sudden loss of pressure control downhole. This may cause the formation to collapse in on the drill string or formation fluids may be uncontrollably released. Methods and systems that account for the multi-porosity and multi-permeability aspects of a formation are beneficial to ensuring health and environmental safety while drilling a well. As such, embodiments disclosed herein include systems and methods that may be put in place while drilling a well to determine an accurate mud weight window (and adjust the mud weight while drilling) for a formation having N-porosity and N-permeability.

FIG. 1 shows a drilling system (100) that may include a drilling rig (110) arranged around a mud processing system (101) having at least one mud processing device (102). The drilling rig (110) may include a top drive (111) that may be suspended in a derrick (112) by a travelling block (113). In the center of the top drive (111), a drive shaft (114) may be coupled to a top pipe of a drill string (115) by threads. The top drive (111) may rotate the drive shaft (114), so that the drill string (115) and a bottom hole assembly (120) cut the rock at the bottom of a wellbore (116). A power cable (117) supplying electric power to the top drive (111) may be protected inside one or more service loops (118) coupled to a control system (144). As such, drilling mud may be pumped into the wellbore (116) through a mud line, the drive shaft (114), and/or the drill string (115). The drilling mud may exit the wellbore (116) and enter the mud processing system (101) though a return line. The mud processing system (101) includes mud processing devices (102) such as mud tanks, shale shakers, mud-gas separators, flare stacks, water storage tanks, liquid additive tanks, and dry additive storage. The drilling mud may also be pumped from the mud processing system (101) to the wellbore (116). Further, the control system (144) may also be coupled to the mud processing system (101).

The control system (144) may include one or more programmable logic controllers (PLCs) that include hardware and/or software with functionality to control one or more processes performed by the drilling system (100) or the mud processing system (101). Specifically, a programmable logic controller may control valve states, fluid levels, pipe pressures, warning alarms, and/or pressure releases throughout a drilling rig. In particular, a programmable logic controller may be a ruggedized computer system with functionality to withstand vibrations, extreme temperatures, wet conditions, and/or dusty conditions, for example, around a drilling rig. Without loss of generality, the term "control system" may refer to a drilling operation control system that is used to operate and control the equipment, a drilling data acquisition and monitoring system that is used to acquire drilling process and equipment data and to monitor the operation of the drilling process, or a drilling interpretation software system that is used to analyze and understand drilling events and progress.

For example, the control system (144) may be coupled to the sensor assembly (123) in order to perform various program functions for up-down steering and left-right steering of the drill bit (124) through the wellbore (116). While one control system (144) is shown in FIG. 1, the drilling system (100) may include multiple control systems for managing various well drilling operations, maintenance operations, well completion operations, and/or well intervention operations. For example, the control system (144) may include hardware and/or software with functionality for geosteering a drill bit through a formation in a lateral well using sensor signals, such as drilling acoustic signals or resistivity measurements.

The wellbore (116) may include a bored hole that extends from the surface into a target zone of the hydrocarbon-bearing formation, such as the reservoir. An upper end of the wellbore (116), terminating at or near the surface, may be referred to as the "up-hole" end of the wellbore (116), and a lower end of the wellbore, terminating in the hydrocarbon-bearing formation, may be referred to as the "down-hole" end of the wellbore (116). The wellbore (116) may facilitate the circulation of drilling mud during well drilling operations, the flow of hydrocarbon production ("production") (e.g., oil and gas) from the reservoir to the surface during production operations, the injection of substances (e.g., water) into the hydrocarbon-bearing formation or the reservoir during injection operations, or the communication of monitoring devices (e.g., logging tools) into the hydrocarbon-bearing formation or the reservoir during monitoring operations (e.g., during in situ logging operations).

As further shown in FIG. 1, sensors (121) may be included in a sensor assembly (123), which is positioned adjacent to a drill bit (124) and coupled to the drill string (115). Sensors (121) may also be coupled to a processor assembly that includes a processor, memory, and an analog-to-digital converter (122) for processing sensor measurements. For example, the sensors (121) may include acoustic sensors, such as accelerometers, measurement microphones, contact microphones, and hydrophones. Likewise, the sensors (121) may include other types of sensors, such as transmitters and receivers to measure resistivity, gamma ray detectors, etc. The sensors (121) may include hardware and/or software for generating different types of well logs (such as acoustic logs or sonic longs) that may provide well data about a wellbore, including porosity of wellbore sections, gas saturation, bed boundaries in a geologic formation, fractures in the wellbore or completion cement, and many other pieces of information about a formation. If such well data is acquired during well drilling operations (i.e., logging-while-drilling), then the information may be used to adjust drilling operations in real-time. Such adjustments may include rate of penetration (ROP), drilling direction, altering mud weight, and many others drilling parameters.

In some embodiments, acoustic sensors may be installed in the mud processing system (101) of the drilling system (100) to record acoustic drilling signals in real-time. Drilling acoustic signals may transmit through the drilling fluid to be recorded by the acoustic sensors located in the drilling fluid circulation system. The recorded drilling acoustic signals may be processed and analyzed to determine well data, such as lithological and petrophysical properties of the rock formation. This well data may be used in various applications, such as steering the drill bit (124) using geosteering.

In some embodiments, a drilling manager (160) is coupled to one or more control systems (e.g., control system (144)) at a wellsite. For example, a drilling manager (160) may include hardware and/or software to collect drilling or formation data (e.g., formation data (150)) from one or more well sites. Likewise, the drilling manager (160) may monitor various drilling operations performed by various service entities. In some embodiments, a drilling manager (160) is a controller located on a server remote from the well site. In another embodiments, the drilling manager (160) may be similar to the control system (144) coupled to the drilling system (100).

Moreover, the drilling manager (160) may include functionality for adjusting drilling mud properties such as mud weight (e.g., command (155)), e.g., by transmitting commands to various network devices (e.g., control system (144)) in the drilling system (100) as well as various user devices at the well site. In some embodiments, for example, the command (155) includes modifying drilling mud parameters based on a mud weight window. The command (155) may also include adjusting the wellbore (116) trajectory, using the geosteering system, based on the mud weight window. For example, the drilling manager (160) may communicate with the control system (144) and the mud processing system (101) to automatically increase or decrease the mud weight using the various mud processing devices (102). The drilling manager (160) may be a computer system similar to computer system (902) described below in FIG. 9 and the accompanying description.

Figure 2A:
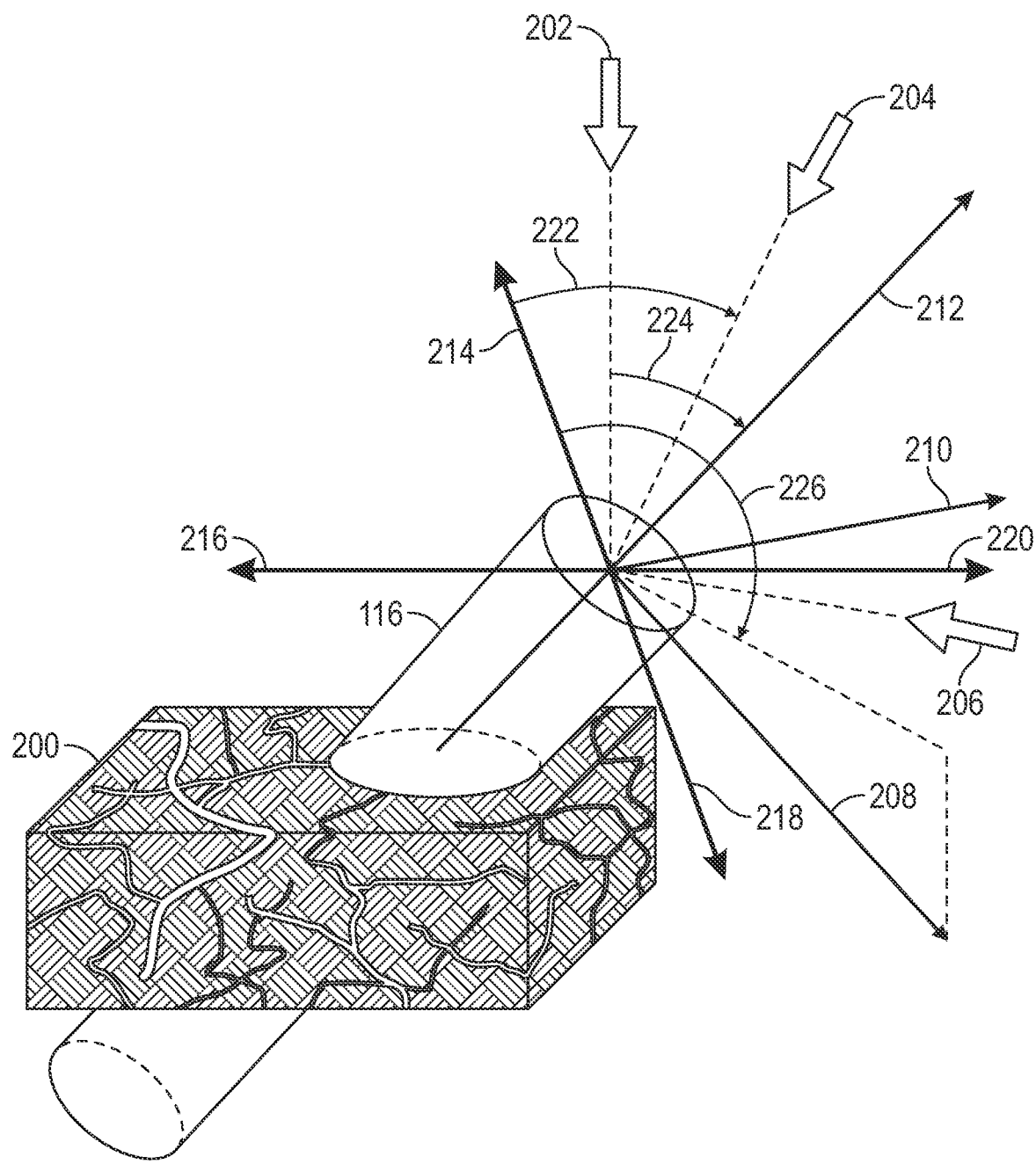
FIGS. 2A and 2B show schematic diagrams representing an inclined wellbore in an N-porosity N-permeability formation in accordance with one or more embodiments.
Figure 2B:
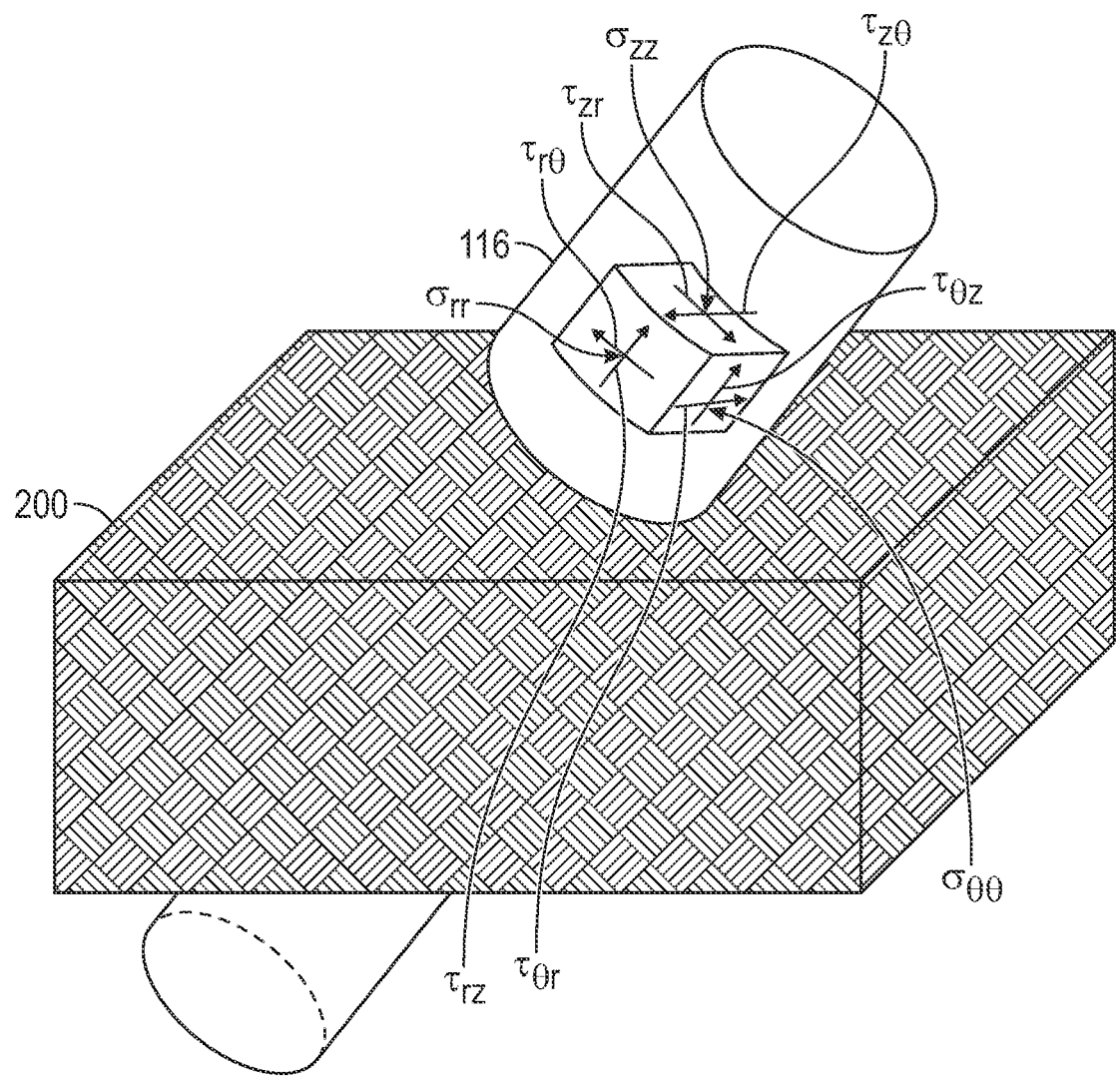

FIGS. 2a and 2b depict an inclined wellbore (116) drilled through a formation (200) having N-porosity and N-permeability. The wellbore (116) is drilled into the formation (200) at an angle. The wellbore (116) may change angle over time making the final wellbore (116) have a plurality of wellbore (116) angles. FIG. 2a shows the far-field stresses, more specifically, FIG. 2a shows the overburden stress (202) ($\sigma_V$), maximum horizontal stress (204) ($\sigma_H$), and minimum horizontal stress (206) ($\sigma_h$) acting on the wellbore (116). The overburden stress (202) is the stress acted on the formation (200) created by the weight of the rock located on top of the formation (200). The minimum and maximum horizontal stresses (206, 204) are the smaller and larger, respectively, horizontal principal stresses that a confined underground rock formation (200) is subjected to.

The wellbore (116) coordinates are depicted as r (208), θ (210), and z (212). The wellbore coordinates are the deviations from vertical and horizontal as well as the depth of the wellbore (116). North (214), East (216), South (218), and West (220) are also depicted in FIG. 1 to show the location of the wellbore (116) relative to the cardinal directions. The azimuth of the maximum horizontal stress (222) ($\sigma_{oH}$), the wellbore (116) inclination (224) ($\sigma_{inc}$), and the wellbore (116) azimuth (226) ($\sigma_{azi}$) are also shown. The wellbore (116) itself has a pressure denoted by $p_w$. The formation (200) is made up of a plurality of porous media. The number of porous media is denoted by the letter N and each porous media has a separate pore pressure $p_i$. For example, the pore pressure for the first porous medium is denoted by $p_1$, the pore pressure for the second porous medium is denoted by $p_2$, and so on and so forth.

FIG. 2b shows the stresses depicted in FIG. 2a but in wellbore (116) coordinates. More specifically, FIG. 2b shows the normal stresses in each direction ($\sigma_{rr}$, $\sigma_{\theta\theta}$, $\sigma_{zz}$) The normal stresses are also known as the "total stress". FIG. 2b also shows the shear stresses ($\tau_{r\theta}$, $\tau_{rz}$, $\tau_{\theta z}$) acting on the wellbore (116). This data, along with others, is used to determine the mud weight window for the formation (200). The process for doing so is outlined below.

Figure 3:
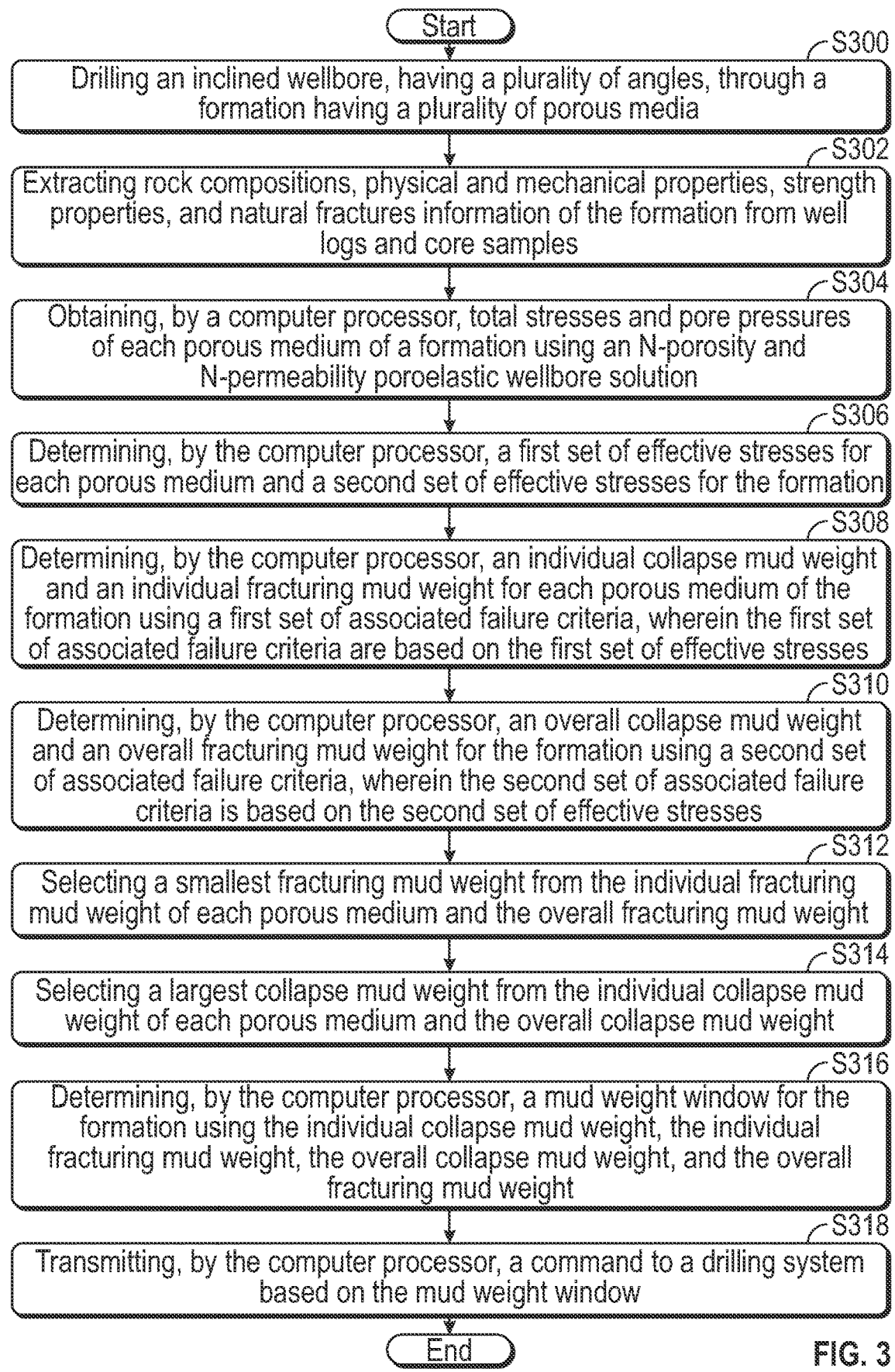
FIG. 3 shows a flowchart in accordance with one or more embodiments.

FIG. 3 depicts a flowchart in accordance with one or more embodiments. More specifically, FIG. 3 illustrates a method for determining a mud weight window for a formation (200). Further, one or more blocks in FIG. 3 may be performed by one or more components as described in FIGS. 1, 2a, and 2b. While the various blocks in FIG. 3 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively. This method may be performed at different depth intervals for a wellbore (116).

Initially, an inclined wellbore (116) is drilled through a formation (200) having a plurality of porous media (S300). The wellbore (116) may be drilled using the drilling system (100) outlined in FIG. 1. Rock compositions, physical and mechanical properties, strength properties, and natural fracture information of the formation (200) are extracted using well logs and core samples (S302). The well logs and core samples may come from the well being currently drilled or they may come from previous wells drilled in the same area/formation (200). The total stress and pore pressure of each porous medium of the N-porosity and N-permeability formation (200) is obtained using a computer processor and an N-porosity and N-permeability poroelastic wellbore (116) solution (S304). The poroelastic wellbore (116) solutions performed by the computer processor to determine the total stress and pore pressure of each porous medium of the N-porosity and N-permeability formation (200) are outlined below:

$$p_i = p_0 + p_i^*, i=1,2,\ldots,N \quad \text{Equation (1)}$$

$$\sigma_{rr} = \sigma_m + \sigma_d \cos 2(\theta - \theta_r) + \sigma_{rr}^* \quad \text{Equation (2)}$$

$$\sigma_{\theta\theta} = \sigma_m - \sigma_d \cos 2(\theta - \theta_r) + \sigma_{\theta\theta}^* \quad \text{Equation (3)}$$

$$\sigma_{zz} = S_z - 2\bar{\nu}\sigma_m + (\sigma_{rr} + \sigma_{\theta\theta}) + (1-2\bar{\nu})[\bar{\alpha}_1(p_1-p_0) + \ldots + \bar{\alpha}_i(p_i-p_0) + \ldots + \bar{\alpha}_N(p_N-p_0)] \quad \text{Equation (4)}$$

Equation (1) is used to determine the overall pore pressure of each porous medium ($p_i$) surrounding the wellbore (116) at the depth of interest. Where $p_0$=the initial pore pressure. Equation (2), (3), and (4) calculate the normal stresses ($\sigma_{rr}$, $\sigma_{\theta\theta}$, $\sigma_{zz}$) or the "total stress" of each porous medium surrounding the wellbore (116) at the depth of interest.

Equation (5)-Equation (14) (shown below) are used to calculate various variables used in Equation (1)-Equation (4). Where $S_x$, $S_y$, and $S_z$ are far-field normal stresses, $\bar{\nu}$=the overall Poisson's ratio, $\bar{\alpha}_{ii}$=the effective Biot's coefficient, $\tau_{r\theta}$, $\tau_{rz}$, and $\tau_{\theta z}$ are the shear stresses, and $A_{ij}$, $B_{ij}$, $C_{ij}$, $D_{ij}$, $a_{ij}$, $b_{ij}$, $c_{ij}$, and $d_{ij}$ are solution coefficients.

$$\tau_{r\theta} = -\sigma_d \sin 2(\theta - \theta_r) + \tau_{r\theta}^* \quad \text{Equation (5)}$$

$$\tau_{rz} = (S_{xz}\cos\theta + S_{yz}\sin\theta)\left(1 - \frac{R^2}{r^2}\right) \quad \text{Equation (6)}$$

$$\tau_{\theta z} = (S_{xz}\cos\theta - S_{yz}\sin\theta)\left(1 + \frac{R^2}{r^2}\right) \quad \text{Equation (7)}$$

$$p_i^* = \sum_{i=1}^{N} A_{i1}K_0(\xi_i r) + \sum_{i=1}^{N} A_{i2}K_2(\xi_i r) + A_{i0} + \frac{a_{i0}}{r^2} \quad \text{Equation (8)}$$

$$a_{rr}^* = \sum_{i=1}^{N} B_{i1}\frac{K_1(\xi_i r)}{\xi_i r} + \sum_{i=1}^{N} B_{i2}\left[\frac{6K_2(\xi_i r)}{\xi_i^2 r^2} + \frac{K_1(\xi_i r)}{\xi_i r}\right] + B_{i0} + \frac{b_{i0}}{r^2} + \frac{b_{0i}}{r^4} \quad \text{Equation (9)}$$

$$\sigma_{\theta\theta}^* = \sum_{i=1}^{N} C_{i1}\left[K_0(\xi_i r) + \frac{K_1(\xi_i r)}{\xi_i r}\right] + \sum_{i=1}^{N} C_{i2}\left[\left(1 + \frac{6}{\xi_i^2 r^2}\right)K_2(\xi_i r) + \frac{K_1(\xi_i r)}{\xi_i r}\right] + C_{i0} + \frac{c_{i0}}{r^2} + \frac{c_{0i}}{r^4} \quad \text{Equation (10)}$$

$$\tau_{r\theta}^* = \sum_{i=1}^{N} D_{i2}\left[\frac{6}{\xi_i^2 r^2}K_2(\xi_i r) + \frac{2K_1(\xi_i r)}{\xi_i r}\right] + \frac{d_{i0}}{r^2} + \frac{d_{0i}}{r^4} \quad \text{Equation (11)}$$

$$\sigma_m = \frac{S_x + S_y}{2} \quad \text{Equation (12)}$$

$$\sigma_d = \frac{\sqrt{(S_x - S_y)^2 + 4S_{xy}^2}}{2} \quad \text{Equation (13)}$$

$$\theta_r = \frac{1}{2}\tan^{-1}\frac{2S_{xy}}{S_x - S_y} \quad \text{Equation (14)}$$

A first set of effective stresses ($\sigma'_{rr,i}$, $\sigma'_{\theta\theta,i}$, $\sigma'_{zz,i}$) for each porous medium is determined using Equation (15)-Equation (17) (below) (S306). The effective stresses act in the same direction as the total stresses. The difference between effective and total stresses is their quantities. That is, effective stresses=total stresses−pore pressures as defined in the below equations:

$$\sigma'_{rr,i} = \sigma_{rr} - p_i, i=1,\ldots,N \quad \text{Equation (15)}$$

$$\sigma'_{\theta\theta,i} = \sigma_{\theta\theta} - p_i, i=1,\ldots,N \quad \text{Equation (16)}$$

$$\sigma'_{zz,i} = \sigma_{zz} - p_i, i=1,\ldots,N \quad \text{Equation (17)}$$

A second set of effective stresses ($\sigma'_{rr}$, $\sigma'_{\theta\theta}$, $\sigma'_{zz}$) for the overall formation (200) is calculated using Equation (18)-Equation (20) (below) (S306):

$$\sigma'_{rr} = \sigma_{rr} - \sum_{i=1}^{N} \bar{\alpha}_i p_i \quad \text{Equation (18)}$$

$$\sigma'_{\theta\theta} = \sigma_{\theta\theta} - \sum_{i=1}^{N} \bar{\alpha}_i p_i \quad \text{Equation (19)}$$

$$\sigma'_{zz} = \sigma_{zz} - \sum_{i=1}^{N} \bar{\alpha}_i p_i \quad \text{Equation (20)}$$

The first set of effective stresses are combined with a first set of associated failure criteria to determine an individual collapse mud weight and an individual fracturing mud weight for each porous medium of the formation (200) (S308). The first set of associated failure criteria is selected from a group including Mohr-Coulomb, Drucker-Prager, modified Lade, Hoek-Brown, and modified Hoek-Brown failure criteria. The individual fracturing mud weight is the mud weight at which that particular porous medium will fracture under. The individual collapse mud weight is the minimum mud weight that is needed to prevent that particular porous medium from collapsing and/or prevent formation fluids from entering the wellbore (116).

The second set of effective stresses are combined with a second set of associated failure criteria to determine an overall collapse mud weight and an overall fracturing mud weight for the formation (200) (S310). The second set of associated failure criteria is selected from a group including Mohr-Coulomb, Drucker-Prager, modified Lade, Hoek-Brown and modified Hoek-Brown failure criteria. The overall fracturing mud weight is the mud weight at which the whole formation (200) will fracture under. The overall collapse mud weight is the minimum mud weight that is needed to prevent the formation (200) from collapsing and/or prevent formation fluids from entering the wellbore (116).

The individual fracturing mud weights for each porous medium and the overall fracturing mud weight are analyzed. A smallest fracturing mud weight is selected from the individual fracturing mud weight of each porous medium and the overall fracturing mud weight of the formation (200) (S312). The individual collapse mud weights for each porous medium and the overall collapse mud weight are analyzed. A largest collapse mud weight is selected from the individual collapse mud weight of each porous medium and the overall collapse mud weight of the formation (200) (S314).

A mud weight window for the formation (200) is determined, using the computer processor, using the individual collapse mud weight, the individual fracturing mud weight, the overall collapse mud weight, and the overall fracturing mud weight (S316). The largest collapse mud weight makes up the low end of the mud weight window and the smallest fracturing mud weight makes up the high end of the mud weight window. This mud weight window is conservative and assumes that the failure of any porous medium will cause failure in the wellbore (116). This may not always be the case, and drilling tolerances, including minor failures of the wellbore (116), may be allowed. In such cases, the porous medium with significant volume fractions may be selected to determine the mud weight window.

A command (155) is transmitted, by the computer processor, to the drilling system (100) based on the mud weight window (S318). Specifically, the command (155) may be transmitted from the drilling manager (160) to the control system (144) which controls the drilling system (100) and the mud processing system (101). The command (155) may include modifying drilling mud parameters based on the determined mud weight window. This command (155) may instruct the mud processing device(s) (102) to increase or decrease the mud weight of the drilling mud. This may be done by adding base fluids, such as water or oil base, to the drilling mud to lower the weight of the drilling mud. Or, weighting additives, such as barite, may be added to the drilling mud to increase the mud weight of the drilling mud. Furthermore, the command (155) may instruct the geosteering system to adjust the wellbore (116) trajectory to avoid certain formations (200) based on that formation's (200) mud weight window.

The method outlined above may be used for any formation (200) having more than one porosity and more than one permeability. For example, this method may be used to determine the mud weight window of a formation (200) where N=2 (i.e., the formation (200) has two individual porous media, each with a different porosity and permeability). The formation (200) may have a wellbore (116) with a radius of 0.1 m drilled into a formation (200) having two porous media (i.e., N=2). The true vertical depth (TVD) is 1000 m. The in-situ stresses and pore pressure gradients are as follows:

$$dS_V = 20\frac{kPa}{m},$$

$$dS_H = \frac{18 kPa}{m},$$

$$dS_h = 16\frac{kPa}{m},$$

$$dPp = 10\frac{kPa}{m}.$$

The average cohesion, friction angle, and tensile strength for the formation (200) are 5 MPa, 10°, and 0 MPa, respectively. This example is outlined below and in FIGS. 4-8. Table 1 (below) includes rock properties for said formation (200). This data may be used in Equation (1)-Equation (20) described above.

TABLE 1

| Parameters | First Porous Medium | Second Porous Medium |
|---|---|---|
| Young's modulus, E (MPa) | 1848 | 18 |
| Poisson's ratio, v | 0.22 | 0.22 |
| Undrained Poisson's ratio, $v_u$ | 0.46 | 0.46 |
| Biot's coefficient, α | 0.96 | 1 |
| Permeability, k (mD) | $5 \times 10^{-5}$ | 0.05 |
| Viscosity, μ (cP) | 1 | 1 |
| Volume Fraction, v (%) | 95 | 5 |
| Cohesion, c (MPa) | 6 | 4.5 |
| Friction angle, ϕ (deg) | 10 | 10 |
| Tensile Strength, TS (MPa) | 0 | 5 |
| Inter-porosity fluid exchange coeff., λ (1/MPa/day) | | $6.5 \times 10^{-3}$ |

Figure 4:
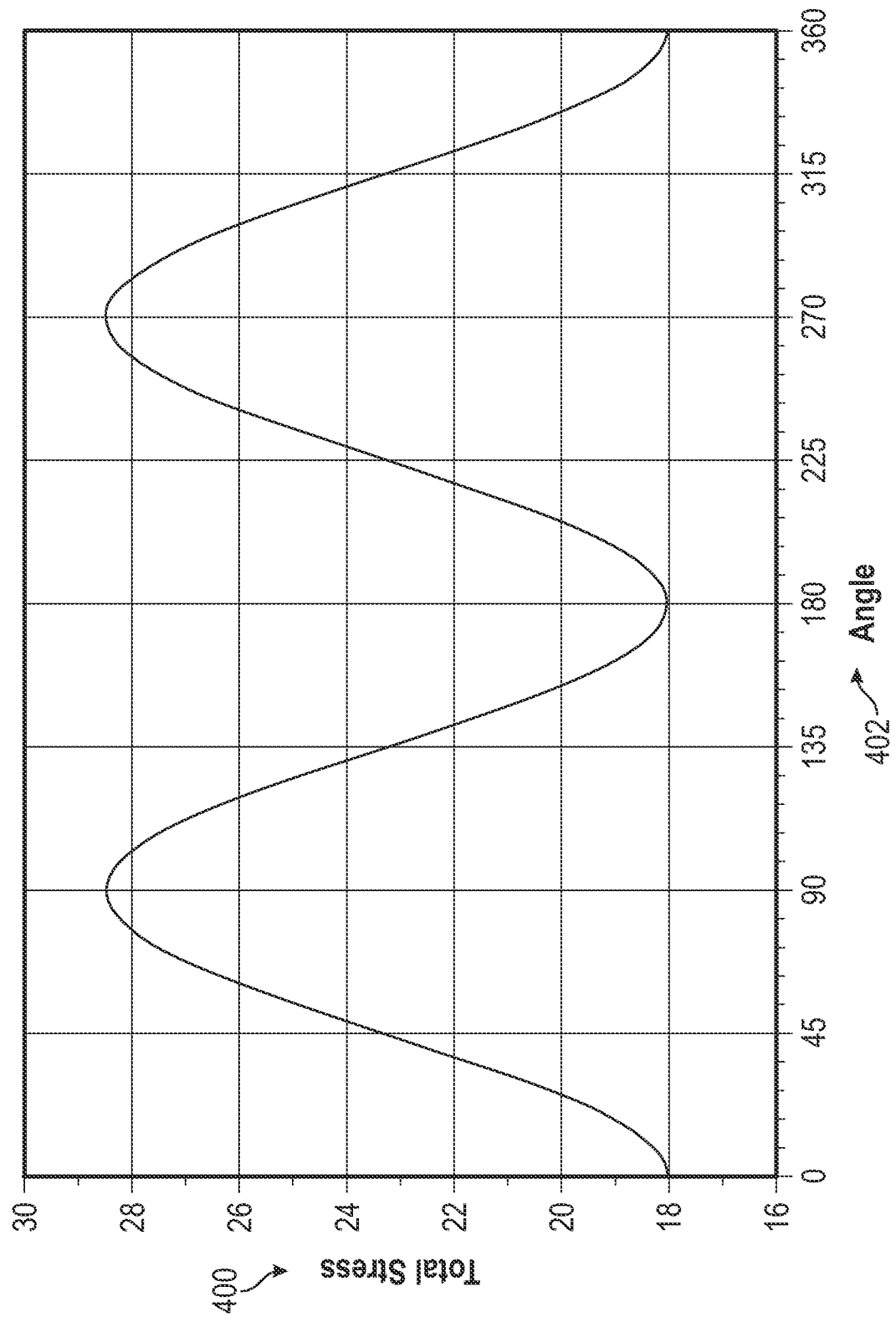
FIG. 4 shows a graph of total stress vs. wellbore angle in accordance with one or more embodiments.
Figure 5:
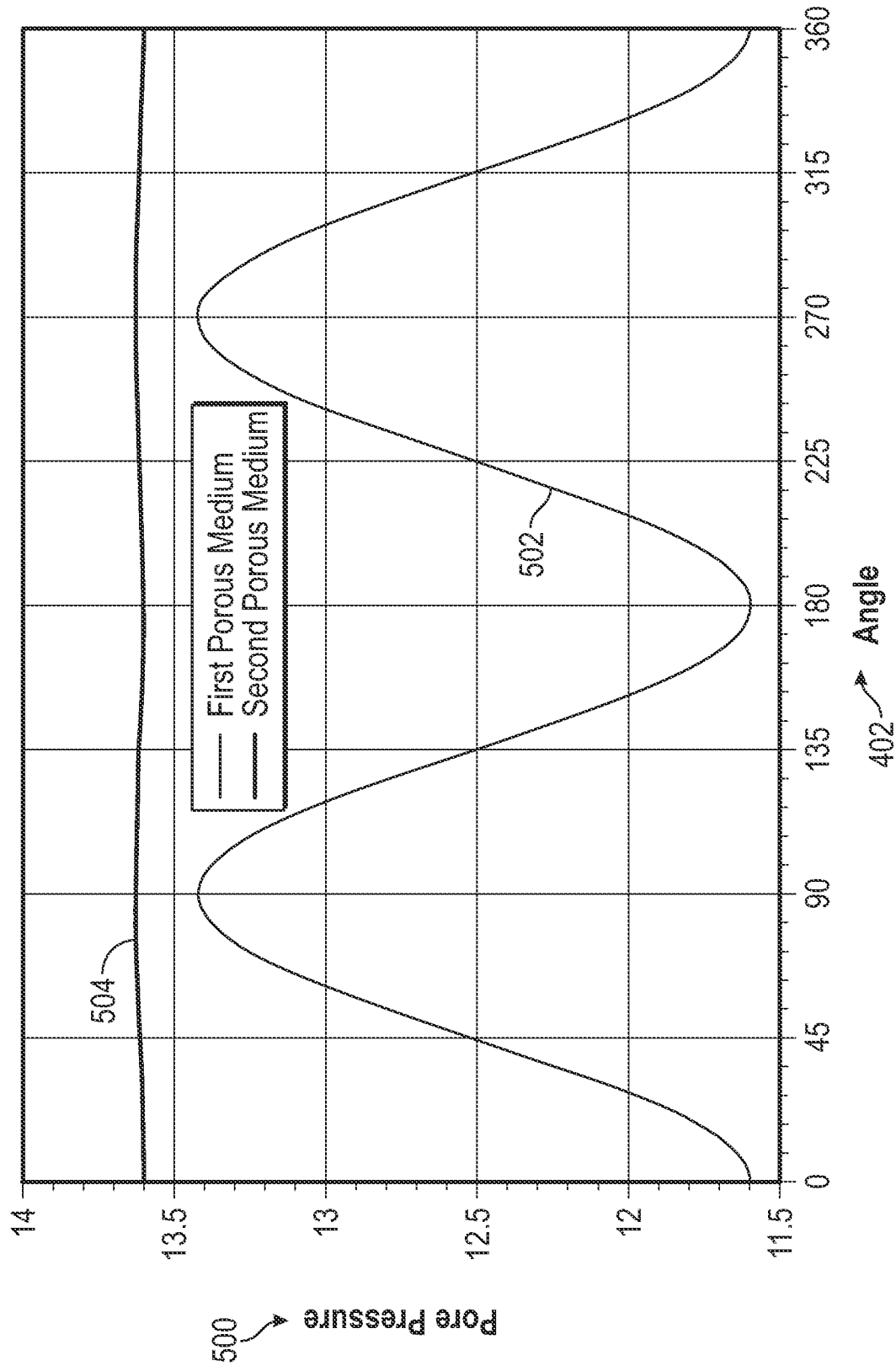
FIG. 5 shows a graph of pore pressure vs. wellbore angle in accordance with one or more embodiments.

FIG. 4 shows a graph of total stress (400) vs. wellbore (116) angle (402). The total stress (400) is determined using Equations (2)-(4). The total stress (400) is the stress surrounding the wellbore (116) after 5 minutes of wellbore (116) drilling. The total stress (400) is determined at different wellbore (116) angles (402). FIG. 5 shows a graph of pore pressure (500) vs. wellbore (116) angle (402). The pore pressures (500) are shown for both the first porous medium (502) and the second porous medium (504) at different angles (402) of the wellbore (116). As can be seen from FIG. 5, the second porous medium (504) has pore pressures (500) higher than the first porous medium (502). The pore pressures (500) are calculated using Equation (1).

Figure 6:
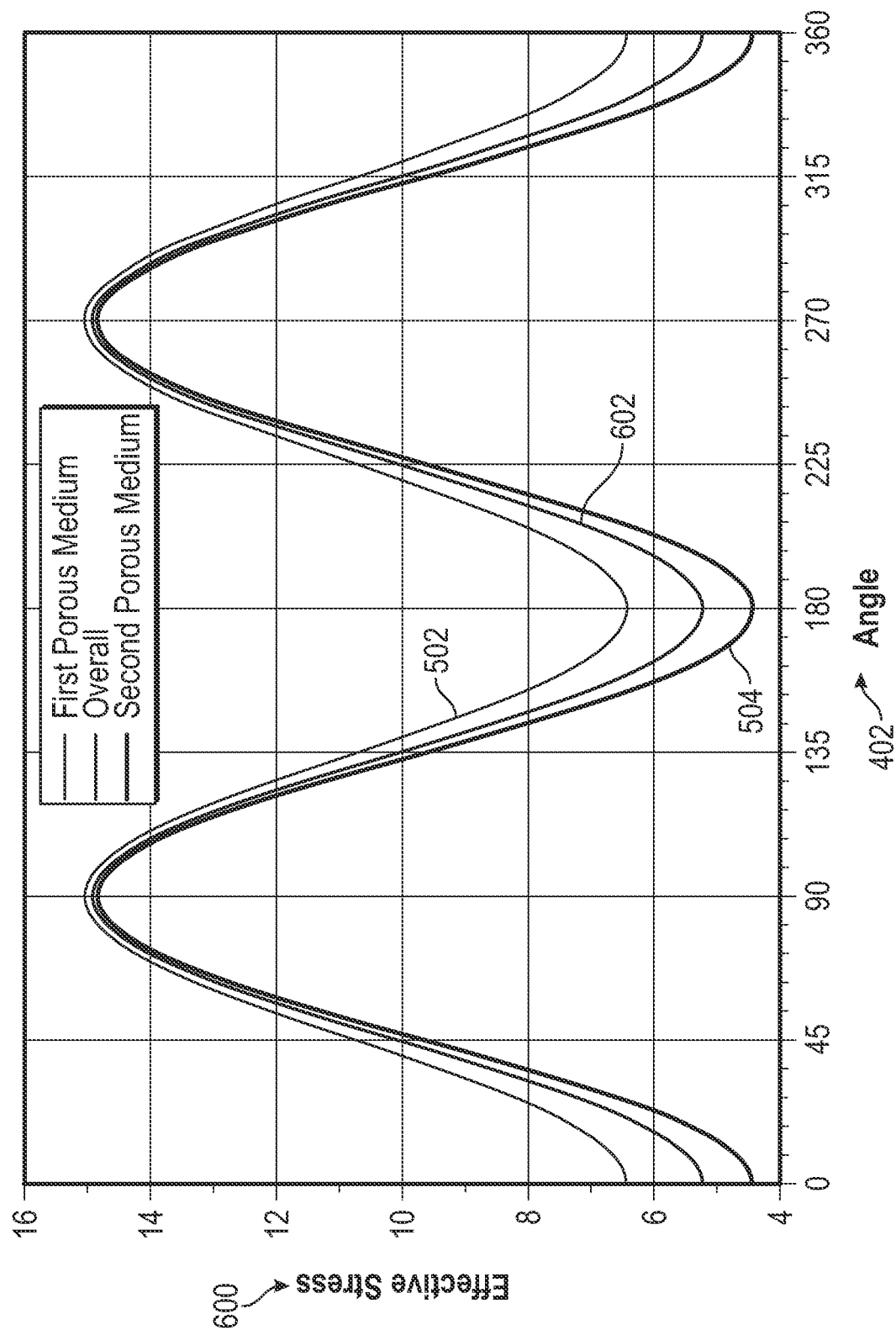
FIG. 6 shows a graph of effective stress vs. wellbore angle in accordance with one or more embodiments.

FIG. 6 shows effective stress (600) vs. wellbore (116) angle (402). The effective stresses (600) are shown for the first porous medium (502), the overall (602) formation (200), and the second porous medium (504) at different angles (402) of the wellbore (116). The first set of effective stresses (600) include the effective stresses (600) for the first porous medium (502) and the second porous medium (504). The second set of effective stresses (600) include the effective stresses (600) for the overall (602) formation (200). The first set of effective stresses (600) are calculated using Equations (15)-(17). The second set of effective stresses (600) are calculated using Equations (18)-(20).

Figure 7:
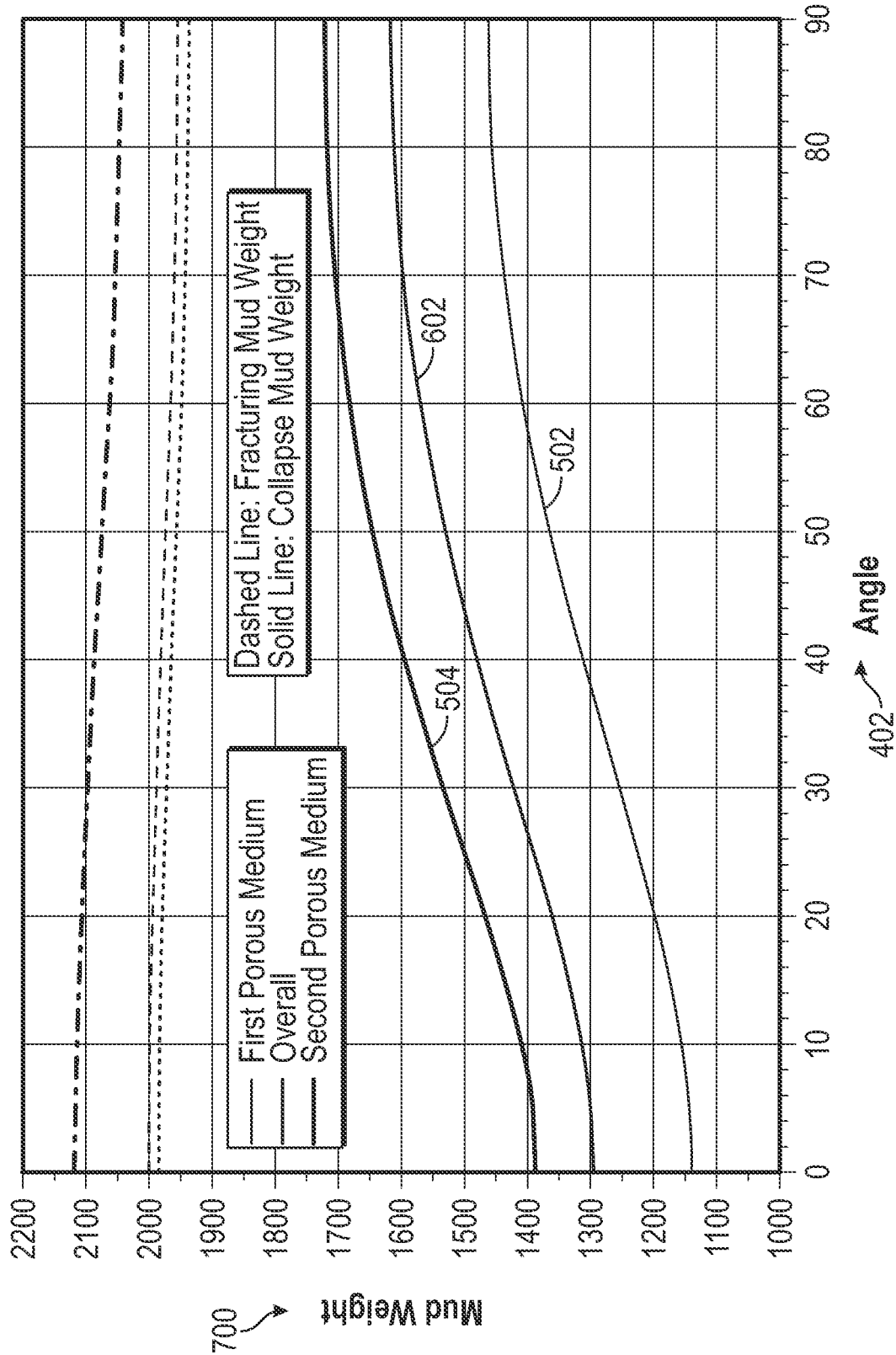
FIG. 7 shows a graph of critical mud weight vs. wellbore angle in accordance with one or more embodiments.

FIG. 7 shows mud weight (700) vs. wellbore (116) angle (402). The fracturing and collapse mud weights are shown for the first porous medium (502), the overall (602) formation (200), and the second porous medium (504). The individual fracturing mud weight and the individual collapse mud weight for both the first porous medium (502) and the second porous medium (504) are determined by combining the first set of effective stresses (600) with the first set of associated failure criteria. The overall (602) fracturing mud weight and the overall (602) collapse mud weight of the overall (602) formation (200) are determined by combining the second set of effective stresses (600) with the second set of associated failure criteria.

Figure 8:
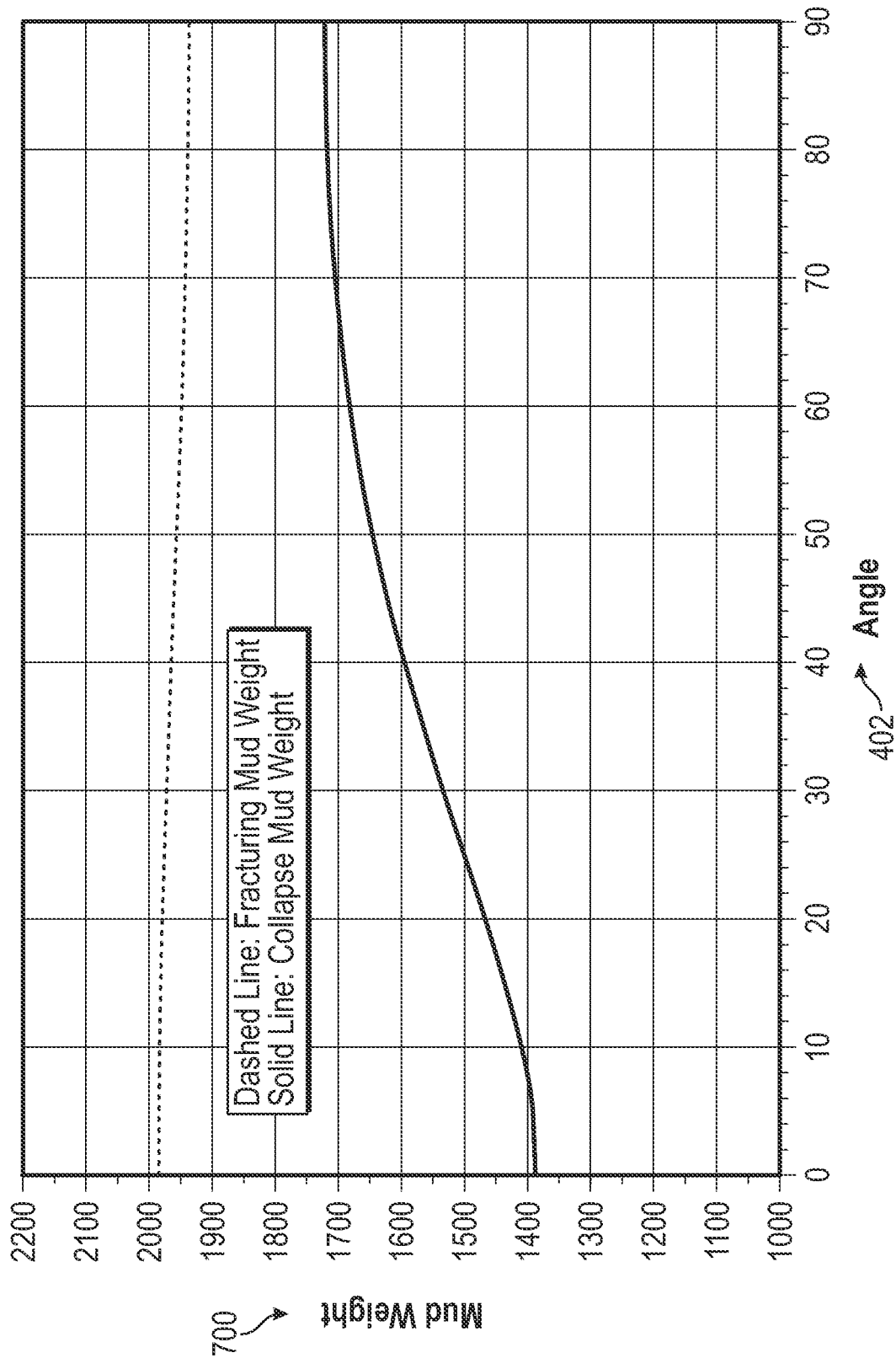
FIG. 8 shows a mud weight window in accordance with one or more embodiments.

FIG. 8 shows the mud weight (700) window for the formation (200). The mud weight (700) window includes the smallest fracturing mud weight (700) and the largest collapse mud weight (700). For this example, the smallest fracturing mud weight (700) is the fracturing mud weight (700) of the overall (602) formation, and the largest collapse mud weight (700) is the collapse mud weight of the second porous medium (504). In this scenario, the drilling manager (160) may send a command (155) to the control system (144) to keep the mud weight (700) of the drilling mud within the mud weight (700) window as shown in FIG. 8. The drilling manager (160) may be a computer system (902) as described in FIG. 9 below.

Figure 9:
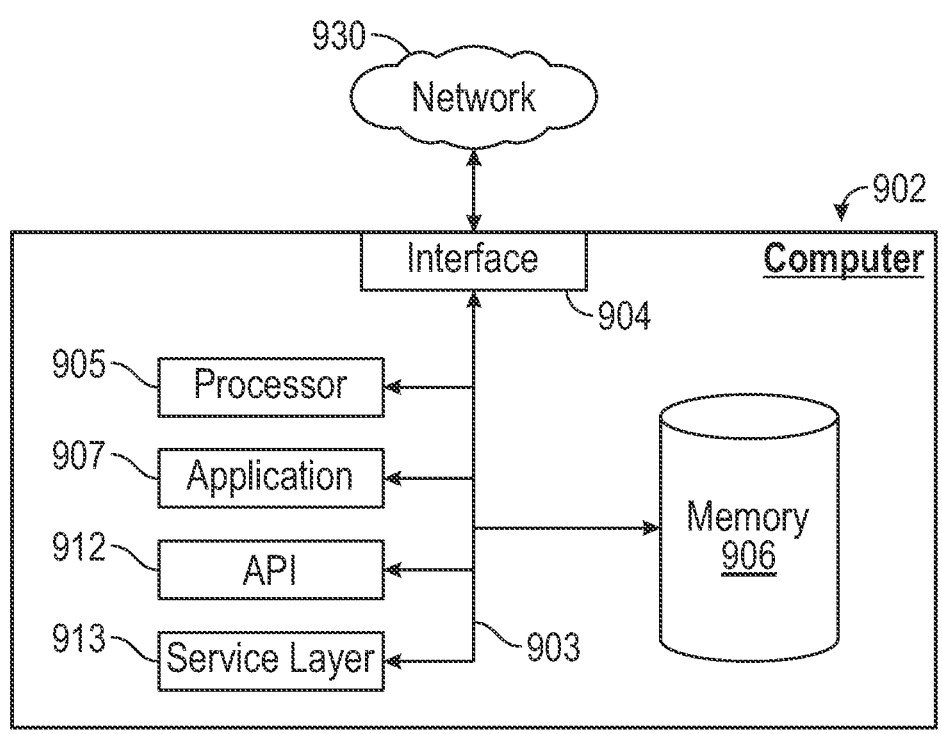
FIG. 9 shows a computer system in accordance with one or more embodiments.

FIG. 9 is a block diagram of a computer system (902) used to provide computational functionalities associated with described algorithms, methods, functions, processes, flows, and procedures as described in the instant disclosure, according to an implementation. The illustrated computer (902) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (902) may include a computer that includes an input device, such as a keypad, keyboard, touch screen, or other device that can accept user information, and an output device that conveys information associated with the operation of the computer (902), including digital data, visual, or audio information (or a combination of information), or a GUI.

The computer (902) can serve in a role as a client, network component, a server, a database or other persistency, or any other component (or a combination of roles) of a computer system for performing the subject matter described in the instant disclosure. The illustrated computer (902) is communicably coupled with a network (930). In some implementations, one or more components of the computer (902) may be configured to operate within environments, including cloud-computing-based, local, global, or other environment (or a combination of environments).

At a high level, the computer (902) is an electronic computing device operable to receive, transmit, process, store, or manage data and information associated with the described subject matter. According to some implementations, the computer (902) may also include or be communicably coupled with an application server, e-mail server, web server, caching server, streaming data server, business intelligence (BI) server, or other server (or a combination of servers).

The computer (902) can receive requests over network (930) from a client application (for example, executing on another computer (902)) and responding to the received requests by processing the said requests in an appropriate software application. In addition, requests may also be sent to the computer (902) from internal users (for example, from a command console or by other appropriate access method), external or third-parties, other automated applications, as well as any other appropriate entities, individuals, systems, or computers.

Each of the components of the computer (902) can communicate using a system bus (903). In some implementations, any or all of the components of the computer (902), both hardware or software (or a combination of hardware and software), may interface with each other or the interface (904) (or a combination of both) over the system bus (903) using an application programming interface (API) (912) or a service layer (913) (or a combination of the API (912) and service layer (913). The API (912) may include specifications for routines, data structures, and object classes. The API (912) may be either computer-language independent or dependent and refer to a complete interface, a single function, or even a set of APIs. The service layer (913) provides software services to the computer (902) or other components (whether or not illustrated) that are communicably coupled to the computer (902).

The functionality of the computer (902) may be accessible for all service consumers using this service layer. Software services, such as those provided by the service layer (913), provide reusable, defined business functionalities through a defined interface. For example, the interface may be software written in JAVA, C++, or other suitable language providing data in extensible markup language (XML) format or other suitable format. While illustrated as an integrated component of the computer (902), alternative implementations may illustrate the API (912) or the service layer (913) as stand-alone components in relation to other components of the computer (902) or other components (whether or not illustrated) that are communicably coupled to the computer (902). Moreover, any or all parts of the API (912) or the service layer (913) may be implemented as child or sub-modules of another software module, enterprise application, or hardware module without departing from the scope of this disclosure.

The computer (902) includes an interface (904). Although illustrated as a single interface (904) in FIG. 9, two or more interfaces (904) may be used according to particular needs, desires, or particular implementations of the computer (902). The interface (904) is used by the computer (902) for communicating with other systems in a distributed environment that are connected to the network (930). Generally, the interface (904) includes logic encoded in software or hardware (or a combination of software and hardware) and operable to communicate with the network (930). More specifically, the interface (904) may include software supporting one or more communication protocols associated with communications such that the network (930) or interface's hardware is operable to communicate physical signals within and outside of the illustrated computer (902).

The computer (902) includes at least one computer processor (905). Although illustrated as a single computer processor (905) in FIG. 9, two or more processors may be used according to particular needs, desires, or particular implementations of the computer (902). Generally, the computer processor (905) executes instructions and manipulates data to perform the operations of the computer (902) and any algorithms, methods, functions, processes, flows, and procedures as described in the instant disclosure.

The computer (902) also includes a memory (906) that holds data for the computer (902) or other components (or a combination of both) that can be connected to the network (930). For example, memory (906) can be a database storing data consistent with this disclosure. Although illustrated as a single memory (906) in FIG. 9, two or more memories may be used according to particular needs, desires, or particular implementations of the computer (902) and the described functionality. While memory (906) is illustrated as an integral component of the computer (902), in alternative implementations, memory (906) can be external to the computer (902).

The application (907) is an algorithmic software engine providing functionality according to particular needs, desires, or particular implementations of the computer (902), particularly with respect to functionality described in this disclosure. For example, application (907) can serve as one or more components, modules, applications, etc. Further, although illustrated as a single application (907), the application (907) may be implemented as multiple applications (907) on the computer (902). In addition, although illustrated as integral to the computer (902), in alternative implementations, the application (907) can be external to the computer (902).

There may be any number of computers (902) associated with, or external to, a computer system containing computer (902), each computer (902) communicating over network (930). Further, the term "client," "user," and other appropriate terminology may be used interchangeably as appropriate without departing from the scope of this disclosure. Moreover, this disclosure contemplates that many users may use one computer (902), or that one user may use multiple computers (902).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed:

1. A method comprising:
obtaining, by a computer processor, total stresses and pore pressures of each porous medium of a formation using an N-porosity and N-permeability poroelastic wellbore solution;
determining, by the computer processor, a first set of effective stresses for each porous medium and a second set of effective stresses for the formation;
determining, by the computer processor, an individual collapse mud weight and an individual fracturing mud weight for each porous medium of the formation using a first set of associated failure criteria, wherein the first set of associated failure criteria are based on the first set of effective stresses;
determining, by the computer processor, an overall collapse mud weight and an overall fracturing mud weight for the formation using a second set of associated failure criteria, wherein the second set of associated failure criteria is based on the second set of effective stresses;
determining, by the computer processor, a mud weight window for the formation using the individual collapse mud weight, the individual fracturing mud weight, the overall collapse mud weight, and the overall fracturing mud weight; and
transmitting, by the computer processor, a command to a drilling system based on the mud weight window.

2. The method of claim 1, further comprising:
drilling an inclined wellbore, having a plurality of angles, through the formation.

3. The method of claim 2,
wherein determining the mud weight window for the formation further comprises:
selecting a smallest fracturing mud weight from the individual fracturing mud weight of each porous medium and the overall fracturing mud weight.

4. The method of claim 3,
wherein determining the mud weight window for the formation further comprises:
selecting a largest collapse mud weight from the individual collapse mud weight of each porous medium and the overall collapse mud weight.

5. The method of claim 4,
wherein the mud weight window for the formation comprises the smallest fracturing mud weight and the largest collapse mud weight.

6. The method of claim 1,
wherein the command comprises modifying drilling mud parameters based on the mud weight window.

7. The method of claim 1,
wherein the command comprises adjusting wellbore trajectory, using a geosteering system, based on the mud weight window.

8. The method of claim 1,
wherein the first set of associated failure criteria further comprises:
one or more associated failure criteria selected from a group consisting of Mohr-Coulomb, Drucker-Prager, modified Lade, Hoek-Brown and modified Hoek-Brown failure criteria.

9. The method of claim 1,
wherein the second set of associated failure criteria further comprises:
one or more associated failure criteria selected from a group consisting of Mohr-Coulomb, Drucker-Prager, modified Lade, Hoek-Brown and modified Hoek-Brown failure criteria.

10. The method of claim 1, further comprising:
extracting rock compositions, physical and mechanical properties, strength properties, and natural fractures information of the formation from well logs and core samples.

11. A system comprising:
a mud processing system coupled to a mud processing device;
a drilling system coupled to the mud processing system; and
a drilling manager comprising a computer processor, wherein the drilling manager is coupled to the drilling system and the mud processing system, the drilling manager comprising functionality for:
obtaining total stresses and pore pressures of each porous medium of a formation using an N-porosity and N-permeability poroelastic wellbore solution;
determining a first set of effective stresses for each porous medium and a second set of effective stresses for the formation;
determining an individual collapse mud weight and an individual fracturing mud weight for each porous medium of the formation using a first set of associated failure criteria, wherein the first set of associated failure criteria are based on the first set of effective stresses;
determining an overall collapse mud weight and an overall fracturing mud weight for the formation using a second set of associated failure criteria, wherein the second set of associated failure criteria is based on the second set of effective stresses;
determining a mud weight window for the formation using the individual collapse mud weight, the individual fracturing mud weight, the overall collapse mud weight, and the overall fracturing mud weight; and
transmitting a command to the drilling system based on the mud weight window.

12. The system of claim 11, further comprising:
drilling an inclined wellbore, having a plurality of angles, through the formation.

13. The system of claim 12,
wherein determining the mud weight window for the formation further comprises:
selecting a smallest fracturing mud weight from the individual fracturing mud weight of each porous medium and the overall fracturing mud weight.

14. The system of claim 13,
wherein determining the mud weight window for the formation further comprises:
selecting a largest collapse mud weight from the individual collapse mud weight of each porous medium and the overall collapse mud weight.

15. The system of claim 14,
wherein the mud weight window for the formation comprises the smallest fracturing mud weight and the largest collapse mud weight.

16. The system of claim 11,
wherein the command comprises modifying drilling mud parameters based on the mud weight window.

17. The system of claim 11,
wherein the command comprises adjusting wellbore trajectory, using a geosteering system, based on the mud weight window.

18. The system of claim 11,
wherein the first set of associated failure criteria further comprises:
 one or more associated failure criteria selected from a group consisting of Mohr-Coulomb, Drucker-Prager, modified Lade, Hoek-Brown and modified Hoek-Brown failure criteria.

19. The system of claim 11,
wherein the second set of associated failure criteria further comprises:
 one or more associated failure criteria selected from a group consisting of Mohr-Coulomb, Drucker-Prager, modified Lade, Hoek-Brown and modified Hoek-Brown failure criteria.

20. The system of claim 11, further comprising:
extracting rock compositions, physical and mechanical properties, strength properties, and natural fractures information of the formation from well logs and core samples.

\* \* \* \* \*